(12) United States Patent
Frank et al.

(10) Patent No.: US 8,099,234 B1
(45) Date of Patent: Jan. 17, 2012

(54) SYSTEM, APPARATUS, AND METHOD FOR GENERATING LOCATION INFORMATION ON AN AIRCRAFT DISPLAY UNIT USING LOCATION MARKERS

(75) Inventors: David A. Frank, North Liberty, IA (US); Daniel Y. Chiew, Marion, IA (US); Travis S. VanDerKamp, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 866 days.

(21) Appl. No.: 12/217,342

(22) Filed: Jul. 3, 2008

(51) Int. Cl.
*G01C 21/30* (2006.01)

(52) U.S. Cl. ........................................... 701/208

(58) Field of Classification Search .................. 701/3–4, 701/14–16, 120–122, 200–202, 206, 208; 340/945, 947, 961, 963–975; 348/113–117
See application file for complete search history.

(56) References Cited

U.S. PATENT DOCUMENTS

2005/0137758 A1* 6/2005 He et al. ............................. 701/3
2009/0248297 A1* 10/2009 Feyersisen et al. ........... 701/206

* cited by examiner

*Primary Examiner* — Kim T Nguyen
(74) *Attorney, Agent, or Firm* — Donna P. Suchy; Daniel M. Barbieri (57) ABSTRACT

A present novel and non-trivial system, apparatus, and method for presenting information to the pilot on an aircraft display unit employed in a synthetic vision system ("SVS"), an enhanced vision system ("EVS"), or combined system. Information regarding the locations of visible and invisible objects related to aviation such as airports, navigation aids and facilities, and airspace are provided by location markers. Data representative of the terrain and location of objects depicted in a scene outside the aircraft are retrieved from one or more data sources. An image generating processor generates an image data set representative of a three-dimensional perspective view of a scene outside the aircraft, wherein the image data set is determined as a function of the terrain data and location marker data associated with the location data. The image data set may be provided to a Head-Down Display unit, a Head-Up Display unit, or both.

20 Claims, 8 Drawing Sheets

SYSTEM, APPARATUS, AND METHOD FOR GENERATING LOCATION INFORMATION ON AN AIRCRAFT DISPLAY UNIT USING LOCATION MARKERS

BACKGROUND OF THE INVENTION

1. Field of the Invention

This invention pertains generally to the field of cockpit indicators or display units that provide flight information to the pilot or flight crew of an aircraft, and more particularly to Synthetic Vision Systems ("SVS"), Enhanced Vision Systems ("EVS"), or combined SVS-EVS systems.

2. Description of the Related Art

Modern avionics systems employ Head-Down Display ("HDD") and Head-Up Display ("HUD") systems for providing tactical flight information to the pilot. In an HDD system, a tactical flight display is mounted in the cockpit instrument panel directly in front of the pilot and below windshield level. To view the presentation of information on a display unit of an HDD system, a pilot must look down into the cockpit, causing him or her to take his or her eyes from the outside scene in front of the aircraft. In a HUD system, a HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot.

Modern avionics systems may employ an SVS, EVS, or combined SVS-EVS for displaying terrain information to both HDD and HUD systems. The SVS and EVS systems are advantageous because they present terrain information and objects of a scene outside the aircraft to the pilot. For example, an airport, airport runways, navigation aids, and obstacles may be objects displayed by an SVS that can increase a pilot's Situational Awareness and potentially provide a means for navigation. While the presentation of this information is advantageous to the pilot, there are times when the depiction of object information could obstruct or obscure a pilot's view of tactical flight information or symbology simultaneously depicted. Airports can vary in size and can be, at times, difficult to identify with the simultaneous display of flight symbology and a three-dimensional perspective view of terrain. This difficulty of identification is especially acute when an airport or another object is relatively distant from the current position of the aircraft and appears relatively small due to the minification of distant objects shown in a three-dimensional perspective view.

The difficulty of identifying distant objects, however, was addressed in U.S. patent application Ser. No. 12/080,120 entitled "System, Apparatus, and Method for Enhancing the Image Presented on an Aircraft Display Unit through Location Highlighters" which is hereby incorporated by reference in its entirety. The use of a location highlighter such as a three-dimensional shape can improve a pilot's ability to determine the location of an airport or other object presented on a display unit by enhancing the image presented on an aircraft display unit without interfering with the presentation of flight symbology. Although the disclosed use of location highlighters included the ability to include information within the highlighter, there could be times when displaying such information would interfere with the simultaneous display of flight symbology and a three-dimensional perspective view of terrain.

BRIEF SUMMARY OF THE INVENTION

The embodiments disclosed herein present at least one novel and non-trivial system, apparatus, and method for enhancing the image presented on an aircraft display unit with the use of location markers. The use of a location marker extending from a location can be used to enhance a pilot's ability to determine the location and information of an airport or other object presented on a display unit without interfering with the presentation of flight symbology.

In one embodiment, a system is disclosed for presenting information on an aircraft display unit with the use of location markers. The system comprises a data source for navigation data, a data source for terrain data, a data source for location data, an image generating processor, and a display unit. The image generating processor could generate an image data set representative of a scene outside the aircraft based upon the navigation data, terrain data, and location data. The image data set could be comprised of terrain image data and location marker data. After the image data set has been generated, the image generating processor could provide the image data set to a display unit for presenting an image representative of the image data set, whereby information associated with at least one object is presented by a location marker. As embodied herein, the image generating processor may be a processor used in an SVS or EVS. As embodied herein, the display unit could include an HDD unit, a HUD unit, or both.

In another embodiment, an apparatus is disclosed for presenting information on an aircraft display unit with the use of location markers. The apparatus comprises an input communications interface, an image generating processor, and an output communications interface. The input communications interface facilitates the receipt of data. The image generating processor could generate an image data set representative of a scene outside the aircraft based upon the navigation data, terrain data, and location data. The image data set could be comprised of terrain image data and location marker data. After the image data set has been generated, the image generating processor could provide the image data set to an output communications interface for facilitating the providing of the image data set to a display unit such as an HDD unit, a HUD unit, or both. As embodied herein, the image generating processor could be a processor used in an SVS or EVS.

In another embodiment, a method is disclosed for presenting information on an aircraft display unit with the use of location markers. Navigation data, terrain data, and location data could be received. An image data set could be generated, wherein the image data set may be representative of a scene outside the aircraft based upon the navigation data, terrain data, and location data, and could be comprised of terrain image data and location marker data. This image data set could be provided to a display unit for presenting an image representative of the image data set, whereby information associated with at least one object is presented by a location marker.

DETAILED DESCRIPTION OF THE INVENTION

In the following description, several specific details are presented to provide a complete understanding of embodiments of the invention. One skilled in the relevant art will recognize, however, that the invention can be practiced without one or more of the specific details or in combination with other components. In other instances, well-known implementations or operations are not shown or described in detail to avoid obscuring aspects of various embodiments of the invention.

Figure 1:
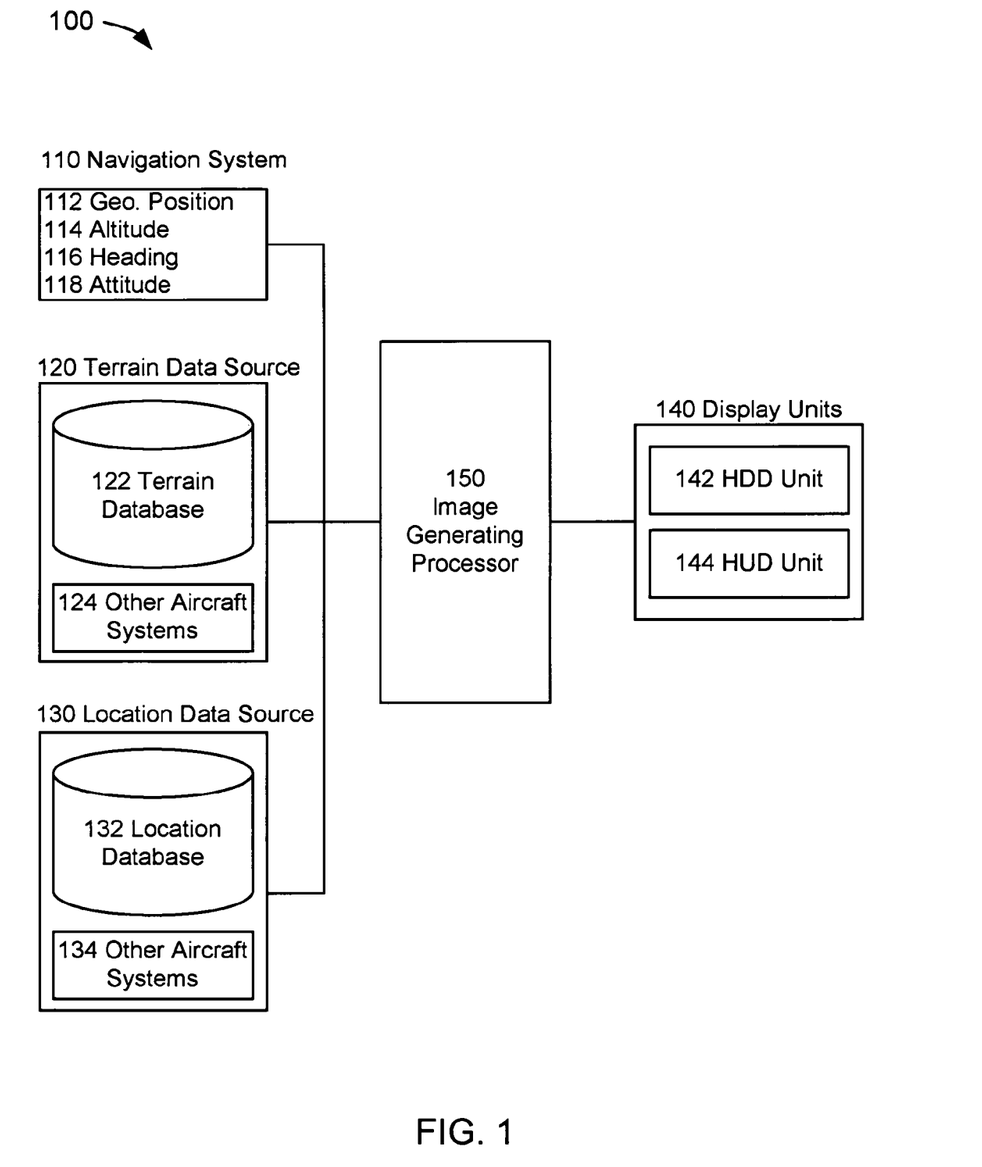
FIG. 1 depicts a block diagram of a system for enhancing the image presented to the pilot on a display unit with the use of location markers.

FIG. 1 depicts a location marker system 100 suitable for implementation of the techniques described herein. The system may be comprised of a navigation system 110, a terrain data source 120, a location data source 130, display units 140, and an image generating ("IG") processor 150.

In an embodiment of FIG. 1, a navigation system 110 comprises the system or systems that could provide navigation data in an aircraft. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system (or satellite navigation system), and a flight management computing system, all of which are known to those skilled in the art. A navigation system 110 could provide navigation data including, but not limited to, geographic position 112, altitude 114, heading 116, and attitude 118. As embodied herein, aircraft position comprises geographic position (e.g., latitude and longitude coordinates), and heading may be derived from either geographic position, aircraft position, or both. As embodied herein, aircraft orientation may include pitch, roll, and/or yaw information related to the attitude of the aircraft. As embodied herein, a navigation system 110 could provide navigation data including, but not limited to, geographic position 112, altitude 114, heading 116, and attitude 118 to an IG processor 150 for subsequent processing as discussed herein.

In an embodiment of FIG. 1, a terrain data source 120 could comprise any source of terrain data, obstacle data, other man-made or natural features, geopolitical boundaries, or any combination thereof. As embodied herein, a terrain data source 120 may include, but is not limited to, a terrain database 122 and other aircraft systems 124 which could employ terrain data. A terrain database 122 may be any database used to store terrain data contained in digital elevation models ("DEM"). Generally, the terrain data of a DEM is stored as grids composed of cells, and each grid or cell represents an area of terrain. A grid or cell may be of various shapes. For example, a grid or cell may be a cell defined in arc-seconds of latitude and longitude, or may be rectangular, square, hexagonal, or circular. A grid or cell may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with the GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including a terrain database 122 and location database 132 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle in terrain database 122 could be stored, a temporary runway closure in an airport database, and a temporary flight restriction in airspace database. Any database used in an embodiments disclosed herein may be a stand-alone database or a combination of databases. For example, a terrain database 122 may be associated with a terrain awareness and warning system ("TAWS") only. In an alternative embodiment, terrain data could be stored in or combined with an airport database, airspace database, or with a database used by any other aircraft system 124 and 134 including, but not limited to, a database associated with a flight management computing system and an airspace awareness and warning system ("AAWS"). An example of a TAWS and an AAWS which utilize airport and airspace databases are described in U.S. patent application Ser. No. 12/069,234 and U.S. Pat. No. 7,714,744, respectively, each of which is hereby incorporated by reference in its entirety.

Although other aircraft systems 124 could employ terrain databases 122, such systems could also be a source of terrain data provided to an IG processor 150. For example, a synthetic vision system ("SVS") may employ a terrain database to generate terrain image data. Here, the terrain database that is part of an SVS could be the source of terrain data in location marker system 100. Alternatively, the SVS could provide an IG processor 150 with terrain data in the form of terrain image data. In another alternative, an Enhanced Vision System ("EVS") could provide terrain data in the form of terrain image data. In another alternative, a combined SVS and EVS could provide terrain data in the form of terrain image data. Other examples of other aircraft systems 124 which could comprise sources of terrain data include, but are not limited to, a TAWS and an AAWS. As embodied herein, a terrain database 122 and other aircraft systems 124 could provide terrain data to an IG processor 150 for subsequent processing as discussed herein.

In an embodiment of FIG. 1, a location data source 130 could comprise any source of location data for one or more visible and invisible objects such as but not limited to, obstacles, airports, navigation aids, and airspaces. A location data source 130 may include, but is not limited to, a location database 132 and other aircraft systems 134. Although not depicted in FIG. 1, a location data source could include a terrain data source 120. A location database 132 could include, but is not limited to, an airport database and airspace database that are part of the previously-mentioned TAWS and AAWS. An airport database may be used to store airport-related data including, but not limited to, airport and runway information. Airport information could include surveyed location and elevation data, and runway information could include surveyed location and elevation data of the runway and runway threshold.

An airspace database may be used to store airspace-related data including, but not limited to, information related to regulatory special use airspace area and non-regulatory special use airspace area data. Regulatory special use airspace data may be comprised of, in part, prohibited areas and restricted areas. Non-regulatory special use airspace data may be comprised of, in part, military operations areas, alert areas, warning areas, and national security areas. Prohibited areas contain airspace of defined dimensions within which the flight of aircraft is prohibited. Such areas may be established for safety, security, national defense, national welfare, or other reasons. Restricted areas contain airspace within which the flight of aircraft, while not wholly prohibited, is subject to restrictions. Restricted areas may denote the existence of unusual, often invisible, hazards to aircraft such as artillery firing, aerial gunnery, or guided missiles. Penetration of restricted areas without authorization from a using or controlling agency may be extremely hazardous to the aircraft and its occupants.

Airspaces may be designated as terminal or enroute airspace. As embodied herein, airspaces may include designated reporting points. Generally, an aviation regulatory authority or organization possesses the authority of designating and defining airspace. In the United States, the Federal Aviation Administration ("FAA") establishes and provides the defined dimensions of an airspace. For example, the FAA has categorized airspace into five classes, i.e., Class A, Class B, Class C, Class D, and Class E, and reporting points.

Generally, airspaces are depicted on aeronautical charts or discussed in other operational publications which provide aeronautical information. An airspace may be delineated by vertical and/or horizontal dimensions. The vertical dimensions of airspace may be designated by altitude floors and ceilings expressed as flight levels or other appropriate measures such as feet or meters above mean sea level (MSL) or other reference including the surface of the earth. The horizontal dimensions of an airspace may be defined by geographic coordinates (e.g., latitude ("lat.") and longitude ("long.")) or other appropriate references that clearly define their perimeter. An airspace may be in effect for one or more designated time periods or run continuously. Additional information regarding airspaces is disclosed in U.S. Pat. No. 7,714,744.

Although other aircraft systems 134 could employ location databases 132, such systems could also be a source of location data provided to an IG processor 150. For example, other aircraft systems 134 which could comprise sources of location data include, but are not limited to, a flight management system, a TAWS, and an AAWS. As embodied herein, a location database 132 and other aircraft systems 134 could provide location data to an IG processor 150 for subsequent processing as discussed herein.

In an embodiment of FIG. 1, display units 140 could include any unit that may provide symbology of tactical flight information including, but not limited to, a Head-Down Display ("HDD") unit 142 and/or a Head-Up Display ("HUD") unit 144. An HDD unit 142 may present tactical information to the pilot or flight crew—information relevant to the instant or immediate control of the aircraft, whether the aircraft is in flight or on the ground. An HDD unit 142 is typically a unit mounted to an aircraft's flight instrument panel located in front of a pilot and below the windshield and the pilot's field of vision. An HDD unit 142 may display the same information found on a primary flight display ("PFD"), such as "basic T" information (i.e., airspeed, attitude, altitude, and heading). Although it may provide the same information as that of a PFD, an HDD unit 142 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. An HDD unit 142 is designed to provide flexible configurations which may be tailored to the desired configuration specified by a buyer or user of the aircraft. In an embodiment of FIG. 1, one or more locations depicted in a three-dimensional terrain image on an HDD unit 142 may be enhanced using location highlighters and markers as disclosed herein.

HUD unit 144 may provide tactical information to the pilot or flight crew, in the pilot's forward field of view through the windshield, eliminating transitions between head-down to head-up flying. Similar to an HDD unit 142, a HUD unit 144 may be tailored to the desired configuration specified by a buyer or user of the aircraft. In an embodiment of FIG. 1, one or more locations depicted in an image of a three-dimensional perspective view of terrain on a HUD unit 144 may be enhanced using location highlighters and markers as disclosed herein. As embodied herein, location highlighters and markers may be employed where terrain is depicted on a HUD unit 144 as a wireframe or as a lighted solid image. An example of a HUD unit 144 which could display terrain information as a lighted solid image is provided in U.S. patent application Ser. No. 12/080,121 entitled "System, Apparatus, and Method for Presenting a Monochrome Image of Terrain on a Head-Up Display Unit" which is hereby incorporated by reference in its entirety. As embodied herein, an HDD unit 142, a HUD unit 144, or both could receive an image data set from an IG processor 150 for subsequent presentation to the pilot or flight crew of an aircraft.

In an embodiment of FIG. 1, an IG processor 150 may receive input data from various systems including, but not limited to, a navigation system 110, a terrain data source 120, and a location data source 130. An IG processor 150 may be operatively coupled to these to facilitate the receiving of input data; as embodied herein, operatively coupled may be considered as interchangeable with electronically coupled. An IG processor 150 may also be operatively coupled to an HDD unit 142, a HUD unit 144, or both to facilitate the providing of output data to a display unit. It is not necessary that a direct connection be made; instead, such receiving of input data and providing of output data could be provided through a data bus or through a wireless network.

In an embodiment of FIG. 1, an IG processor 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. An IG processor 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, a processor could also consist of more than one electronic data processing unit. As embodied herein, an IG processor 150 could be a processor(s) used by or in conjunction with any other system of the aircraft including, but not limited to, a processor(s) associated with an SVS, an EVS, a flight management computing system, a TAWS, an AAWS, one or more display units, or any combination thereof.

In an embodiment of FIG. 1, an IG processor 150 may generate an image data set comprising terrain image data representative of terrain based upon the terrain data, and location highlighter and marker data which could be associated with location data. An IG processor 150 could receive terrain data from a terrain data source 120. If the terrain data is not terrain image data, the IG processor 150 could determine terrain image data by determining the position where each terrain cell would appear on the screen of a display unit; for example, the determination of position could include a scaling component to convert "world space" (of the view outside the aircraft) to "screen space." An IG processor 150 could determine topographical colors similar to those depicted on standard aeronautical charts based upon the terrain data. The three-dimensional perspective view and topographical coloring represented by terrain image data presents an alternative view to the "blue/brown" electronic attitude indicator used in classic electronic PFDs, the creation of the perspective view and employment of a coloring scheme are known to those skilled in the art.

Additionally, an IG processor 150 could receive location data from a location data source 130. The IG processor could determine location highlighters, location markers, or both associated with the location data. An IG processor 150 could determine highlighter and/or marker data by determining the position where the symbology would appear on the screen of a display unit; for example, a determination of the position made by an IG processor 150 could include a scaling component to convert "world space" to "screen space." Then, an IG processor 150 could ensure that the highlighter and/or marker data will provide a sufficient contrast with the terrain data and symbology of flight information. Then, the highlighter and/or marker data may be combined with the terrain image data to form an image data set that will be provided to an HDD unit 142, a HUD unit 144, or both for presentation to a pilot or flight crew.

Figure 2A:
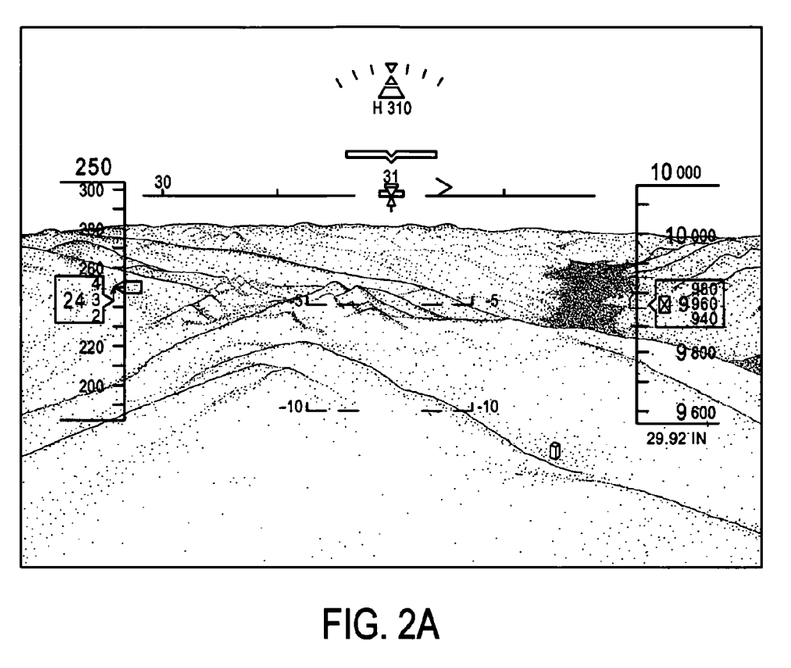
FIG. 2A depicts an exemplary illustration of an image on a display unit depicting a scene outside the aircraft with symbology providing tactical flight information.

The advantages and benefits of the embodiments discussed herein may be illustrated by showing examples of enhancing locations through the use of location highlighters, location markers, or both as embodied in the subsequent figures. The drawings of FIGS. 2A through 2D provide exemplary depictions displaying the location highlighters that could be presented on an HDD unit 142; the location highlighters could be presented on a HUD unit 144. FIG. 2A provides an example of a depiction of an HDD unit 142 presenting symbology of tactical flight information to the pilot or flight crew against a backdrop of a three-dimensional terrain without the presentation of location highlighters or the embodiments herein. It should be noted that the symbology depicted on the HDD unit 142 shown in FIGS. 2A, 2C, and 2D has been made minimal intentionally for the sake of presentation and is not indicative of the plurality of indications or information with which it may be configured. Because the indications or information shown in FIG. 2A are well-known to those skilled in the art, a discussion of the specific tactical information shown in FIG. 2A is not provided herein.

Figure 2B:
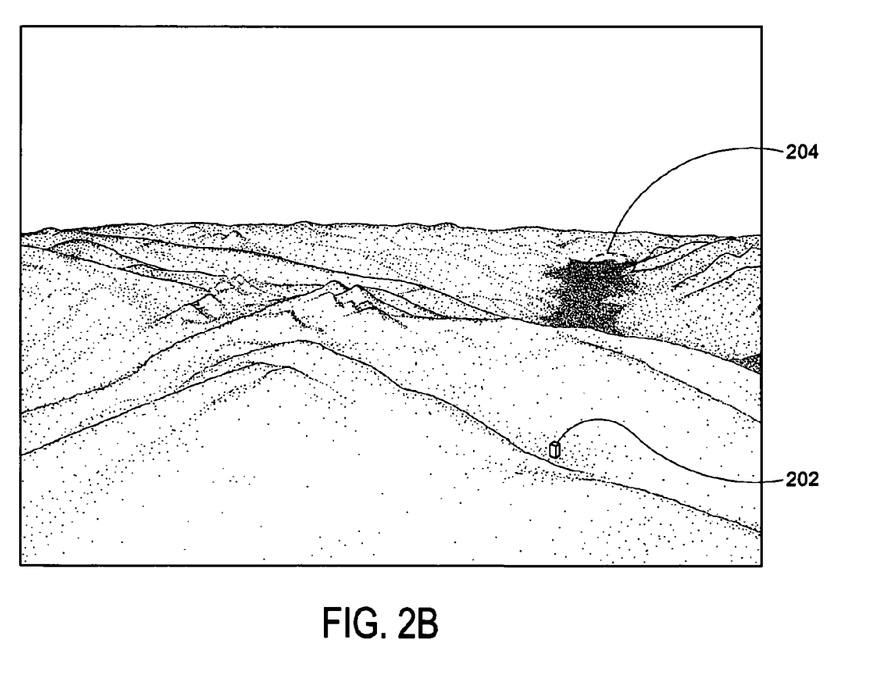
FIG. 2B depicts an exemplary illustration of an image on a display unit depicting a scene outside the aircraft without tactical flight information symbology.

FIG. 2B provides an example of a depiction of the HDD unit 142 shown in FIG. 2A without the presentation of tactical information. The image presented on the face of an HDD unit 142 may be a representation of a scene outside the aircraft as viewed by the pilot. Objects which may be depicted on a HDD unit 142 and highlighted using the embodiments disclosed herein include, but are not limited to, airports, navigation facilities, and designated airspace, information which may be provided by a location data source 130. Terrain and obstacles (buildings, towers, smoke stacks, antennas, etc.) could also be depicted and highlighted based upon data which could be provided by a terrain data source 120. For example, FIG. 2B illustrates two objects at their respective locations: item 202 depicts an object (e.g., obstacle such as a tower, building, etc.) near the aircraft and item 204 depicts an object (e.g., an airport) far from the aircraft. As seen in FIG. 2B, obstacle 202 is more discernable than airport 204 because it is closer to the aircraft. Naturally, the further away the aircraft is from an object, the more difficult it is for the pilot to have it in sight with the naked eye. In the presentation of a scene in front of the aircraft, airport 204 appears relatively small due to the minification of distant objects in a three-dimensional perspective view.

FIG. 2B accurately reflects the relative ease with which a pilot may identify a nearby object but the relative difficulty with which a distant object may be identified. The overall size of airport 204 from a distance is relatively small and blends in with the terrain or surrounding environment. In addition, airport 204 could blend in with tactical information symbology of FIG. 2A that may overlay the depiction of airport 204, potentially confusing the pilot or providing incomplete information to him or her on the face of the HDD unit 142. Also, although not depicted in FIG. 2B, a pilot's line-of-sight to the object could be blocked by terrain between the aircraft and object if the blocking terrain is sufficiently high or the altitude of the aircraft is sufficiently low.

Figure 2C:
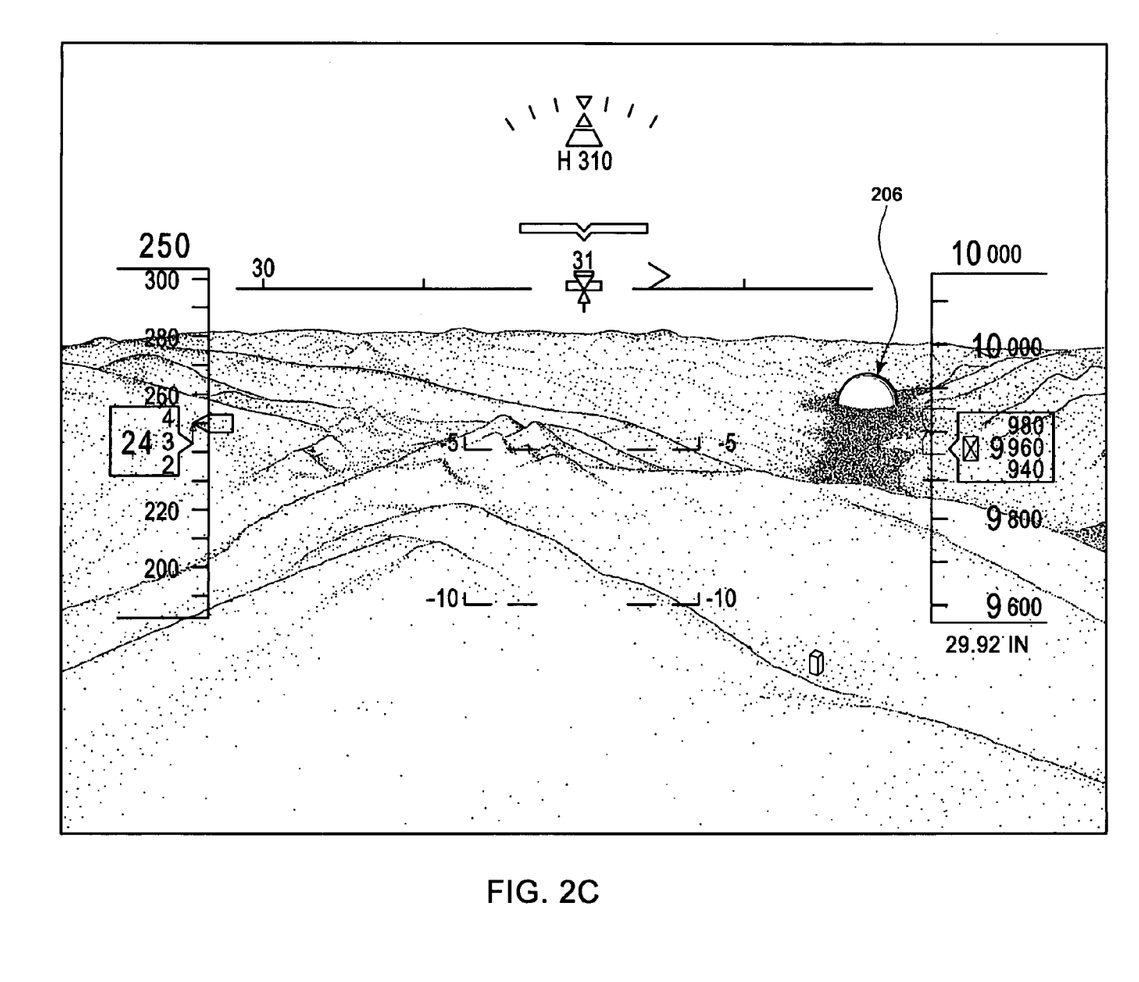
FIGS. 2C and 2D depict exemplary illustrations of an image presented on a display unit with the use of location highlighters.

FIG. 2C provides an example of a depiction of a highlighter enhancing the location of an object as embodied herein displayed on an HDD unit 142. Item 206 illustrates a highlighter for enhancing the location of airport 204 as embodied herein. In this instance, a three-dimensional dome illuminates the location of airport 204 shown in FIG. 2B. In this example, the use of a location highlighter 206 enhances a pilot's ability to determine the location of airport 204 on an HDD unit 142 by making the location of the object conspicuous against the surrounding environment (i.e., terrain) and tactical information symbology shown on the face of the display unit. By making the location of the object conspicuous with the illuminating symbology of a location highlighter 206, the likelihood of objects blending in with the terrain or tactical information symbology may be significantly reduced while situational awareness of the pilot is simultaneously enhanced. Additionally, location highlighter 206 could illuminate a location of an object that is hidden. For example, an object that is blocked from the pilot's line-of-sight as discussed above could nevertheless be illuminated with a location highlighter, thereby allowing the pilot to approximate the location of the object.

A plurality of location highlighters is available to or configurable by a manufacturer or end-user. Those skilled in the art will appreciate the ability and ease with which executable software code may be reprogrammed or modified by a manufacturer or end-user to facilitate a configuration of one or more location highlighters selected by a manufacturer or end-user without affecting or expanding the scope of the embodiments discussed herein. In the following paragraphs, other examples are provided to illustrate the ability with which a manufacturer or end-user may define a location highlighter and location marker as embodied herein. These illustrations are intended to provide examples of location highlighters and location markers, and are not intended to provide a limitation or an exhaustive list of the embodiments discussed herein.

The characteristics of a location highlighter could depend on the object whose location is being highlighted. For example, an object could be associated with a shape. Airport 204 of FIG. 2B is indicated with a three-dimensional dome location highlighter 206 in FIG. 2C. In another example, a bowling pin could be used to indicate a VOR navigation facility because such facility resembles one. In another example, an upside-down wedding cake could be used to indicate designated airspace such as a terminal control area. In another example, a single line or parallel lines could be used to indicate an airway. A location highlighter could be represented as two-dimensional or three-dimensional, and it could be open-ended or closed.

A location highlighter 206 could include enhancing effects such as, but not limited to, shading, transparency, translucency, opacity, texture-mapping, bump-mapping, fogging, shadowing, patterns, colors, or any combination thereof. For example, transparency could be one of a plurality of enhancing effects for location highlighter 206; that is, an outline of terrain "behind" the airport 204 could still be visible to the pilot. In another example, location highlighter 206 depicts a dome as the having one color (e.g., white), but the "outer surface" of the location highlighter 206 could be shown as having patterns; for instance, the pattern could be resemble a soccer ball. In another example, a location highlighter 206 could begin fading away as the aircraft approaches the object by, for example, varying the level or degree of such enhancing effect as a function of distance. The utilization and employment of enhancing effects are known to those skilled in the art.

Another enhancing effect could be color. A location highlighter could be enhanced by color on a display where colors may be presented, and such color could depend on the distance between the object and the aircraft, where each color could represent a specific range to the object. In another example, a destination airport could be shown in a different color from the others appearing in the scene. In another embodiment, colors could correspond to colors generally depicted in aeronautical charts or aviation-related publications. In another example, a location highlighter could remain steady or flash intermittently, where such flashing could depend on the distance between the object and the aircraft, where such flashing could represent a specific range to the object. Each of these examples are intended to provide an example of enhancements which highlight the locations of objects, and are not intended to provide a limitation or an exhaustive list to the embodiments discussed herein.

Figure 2D:
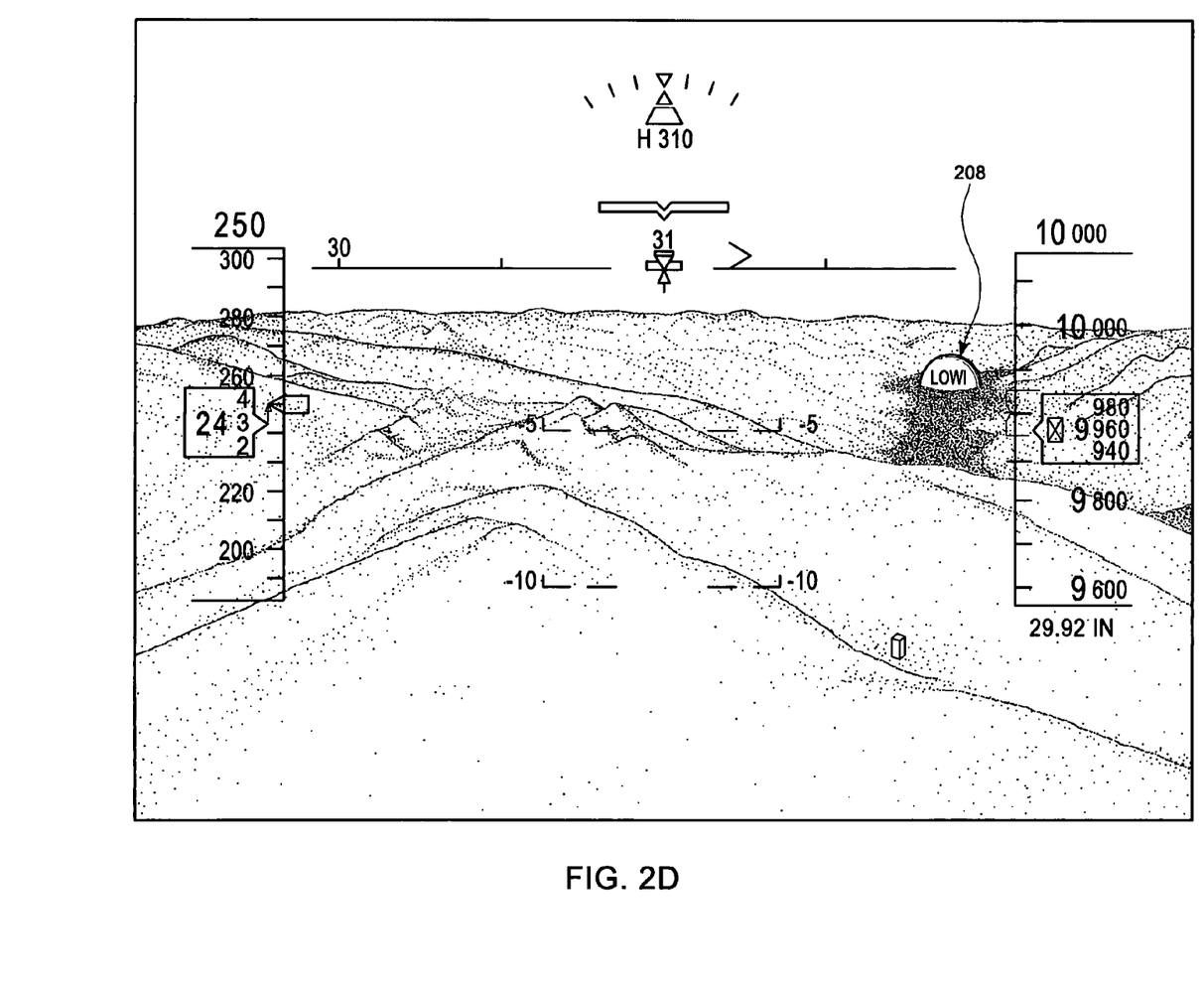

FIG. 2D provides an example of a depiction of the location highlighter 206 of FIG. 2C with alpha-numeric information included within the illuminating symbology of the location highlighter. As shown in FIG. 2D, airport 204 is identified as Innsbruck Kranebitten Airport in Austria as indicated by four-letter identifier "LOWI," the airport code assigned by the International Civil Aviation Organization ("ICAO"). Alternatively, airport 204 could have been identified by the three-letter identifier "INN," the airport code assigned by the International Air Transport Association ("IATA"). The use of an identifier could be optional to the manufacturer or end-user.

Moreover, the identifier could be inhibited from display if such identifier could obscure or interfere with the presentation of other tactical information symbology. In another example, the range to the object such as an airport could be displayed.

Figure 3A:
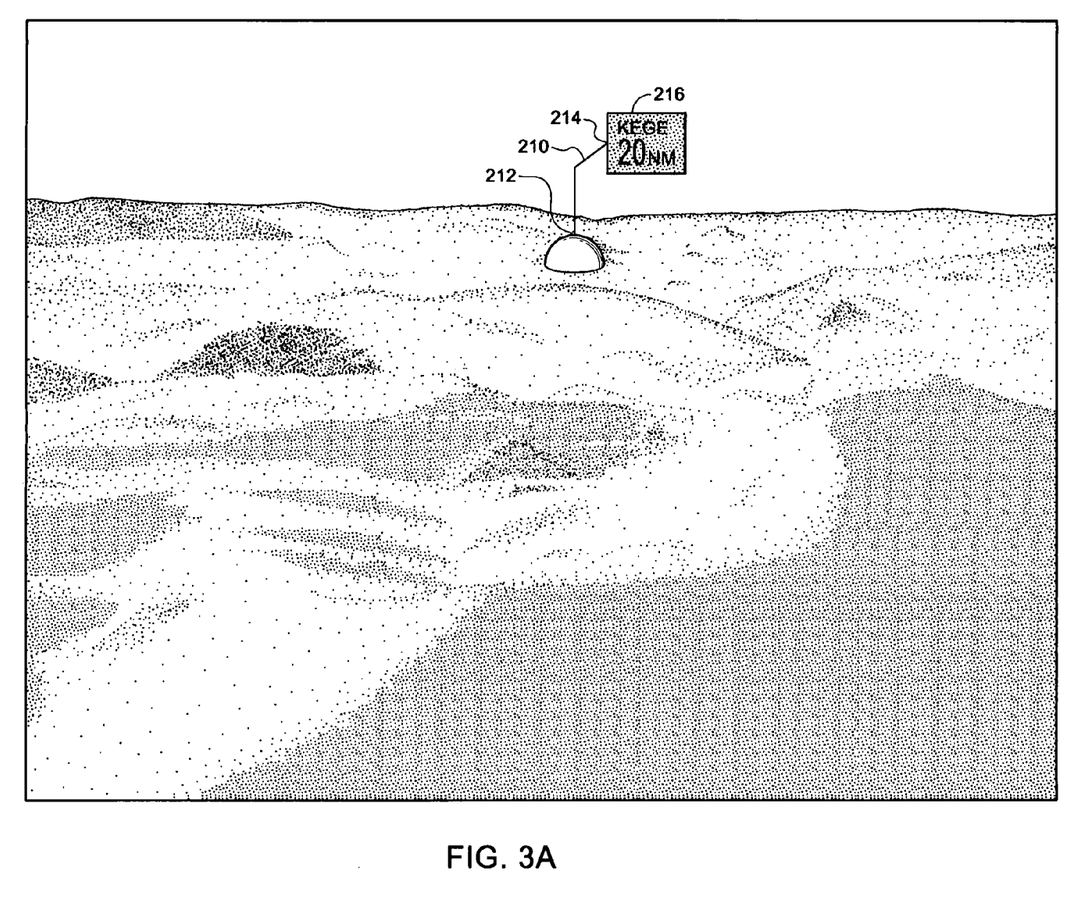
FIGS. 3A and 3B depict exemplary illustrations of an image presented on a display unit with the use of location markers.

FIG. 3A provides an example of a depiction on a display unit of a location marker used in conjunction with a location highlighter without the depiction of tactical information symbology. FIG. 3A illustrates an object on the ground highlighted with a three-dimensional dome selected by a manufacturer or end-user for enhancing the location of an airport. A location marker is shown as extending from the location enhanced by a location highlighter. In an embodiment of FIG. 3A, a location marker could include any object comprised of an extension 210 having one or more segments, a proximal end portion 212 of the extension located at or near the edge of a location highlighter, and a distal end portion 214 of the extension. Also, an informational placard 216 providing information associated with or related to the location could be included at the distal end portion of the extension. An informational placard could be configured to provide any information to the pilot or flight crew including, but not limited to, an identifier and distance. It should be noted that the information that could be displayed on an informational placard is not limited to It should be noted that a location marker does not have to be used in conjunction with a location highlighter discussed herein; if it is not used in conjunction with a location highlighter, the proximal end portion of the extension could be located at or near the location.

As may be deduced from the informational placard of the location marker shown in FIG. 3A, the airport is identified as Eagle County Regional Airport in Eagle County, Colorado, United States as indicated by four-letter identifier "KEGE," the airport code assigned by the ICAO; alternatively, the airport could have been identified by the three-letter identifier "EGE," the airport code assigned by the IATA. As embodied herein, an airport identifier is information that could be included in a location marker. In an embodiment of FIG. 3A, the location marker also provides distance information to the location, i.e., the airport is located 20 nautical miles from the aircraft position.

A plurality of location markers could be available to or configurable by a manufacturer or end-user. Those skilled in the art will appreciate the ability and ease with which executable software code may be reprogrammed or modified by a manufacturer or end-user to facilitate a configuration of one or more location markers selected by a manufacturer or end-user without affecting or expanding the scope of the embodiments discussed herein. In the following paragraphs, other examples are provided to illustrate the ability with which a manufacturer or end-user may define a location marker as embodied herein. These illustrations are intended to provide examples of location markers, and are not intended to provide a limitation or an exhaustive list of the embodiments discussed herein.

The same characteristics disclosed above for location highlighters could be applied to location markers. For example, the shape of a location marker could be associated with an object at the location and could include enhancing effects. As shown in FIG. 3A, the shape of the extension is comprised of two segments, and each segment is depicted as a solid, straight line. An extension, however, is not limited to solid, straight lines. As embodied herein, any means for depicting a straight line could be used including, but not limited to, the use of dashes and dots to depict dashed and dotted lines, respectively. Moreover, if a line is used, it is not limited to a straight line; it could be a curved line. In another example, a curved and straight line could comprise an extension. In another example, the widths or weights of lines could be range from thin to thick. In another example, a line could be generated to appear three-dimensional. An extension is not limited to lines. As embodied herein, an extension could be comprised of arrows, pointers, or any other shape of which the proximal end portion of the extension is substantially reduced to a point. Moreover, such extension could be generated to appear as either two-dimensional or three-dimensional.

While the preceding discussion focused on characteristics of an extension of a location marker, the use of such characteristics is not limited to an extension. The use of such characteristics could be applied to an informational placard 216. As shown in FIG. 3A, an enhancing effect of shading of a color is illustrated, where the shading distinguishes the placard from the background. In another example, lines could delineate a placard. In another example, a placard could be embedded in an extension if the width of the distal end is sufficient to accommodate the presented information.

Figure 3B:
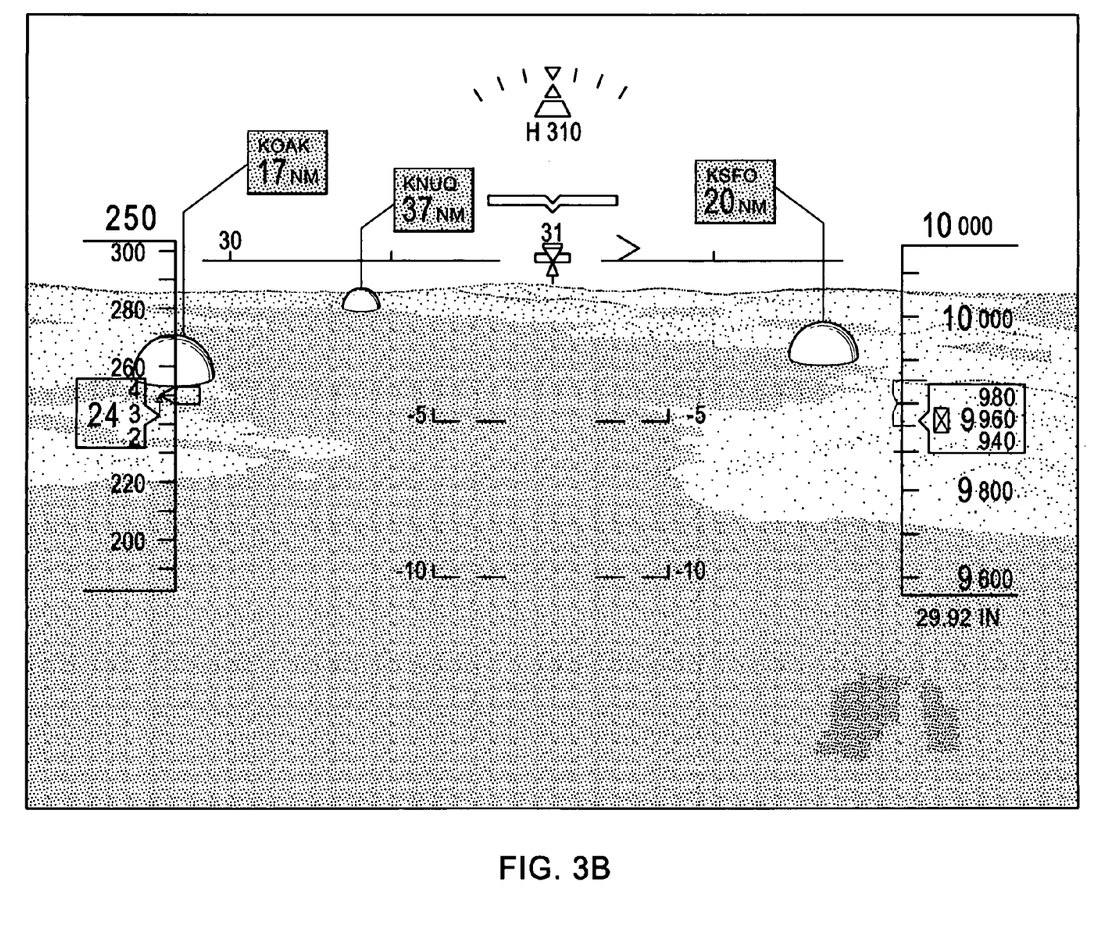

The use of a location marker is not limited to a depiction of a single location marker on a display unit. In an embodiment of FIG. 3B, a plurality of location markers could be configured for use by a manufacturer or end-user. As may be deduced from the informational placards of the location markers shown in FIG. 3B, the identification and distance information of three airports can be discerned: Oakland International Airport in Oakland, Calif., United States (identified by the ICAO identifier "KOAK") is located 17 nautical miles from the aircraft; San Francisco International Airport in San Francisco, Calif. (identified by the ICAO identifier "KSFO") is located 20 nautical miles from the aircraft; and Mountain View/Moffett Federal Airfield in Mountain View, Calif. (identified by the ICAO identifier "KNUQ") is located 37 nautical miles from the aircraft.

Figure 4:
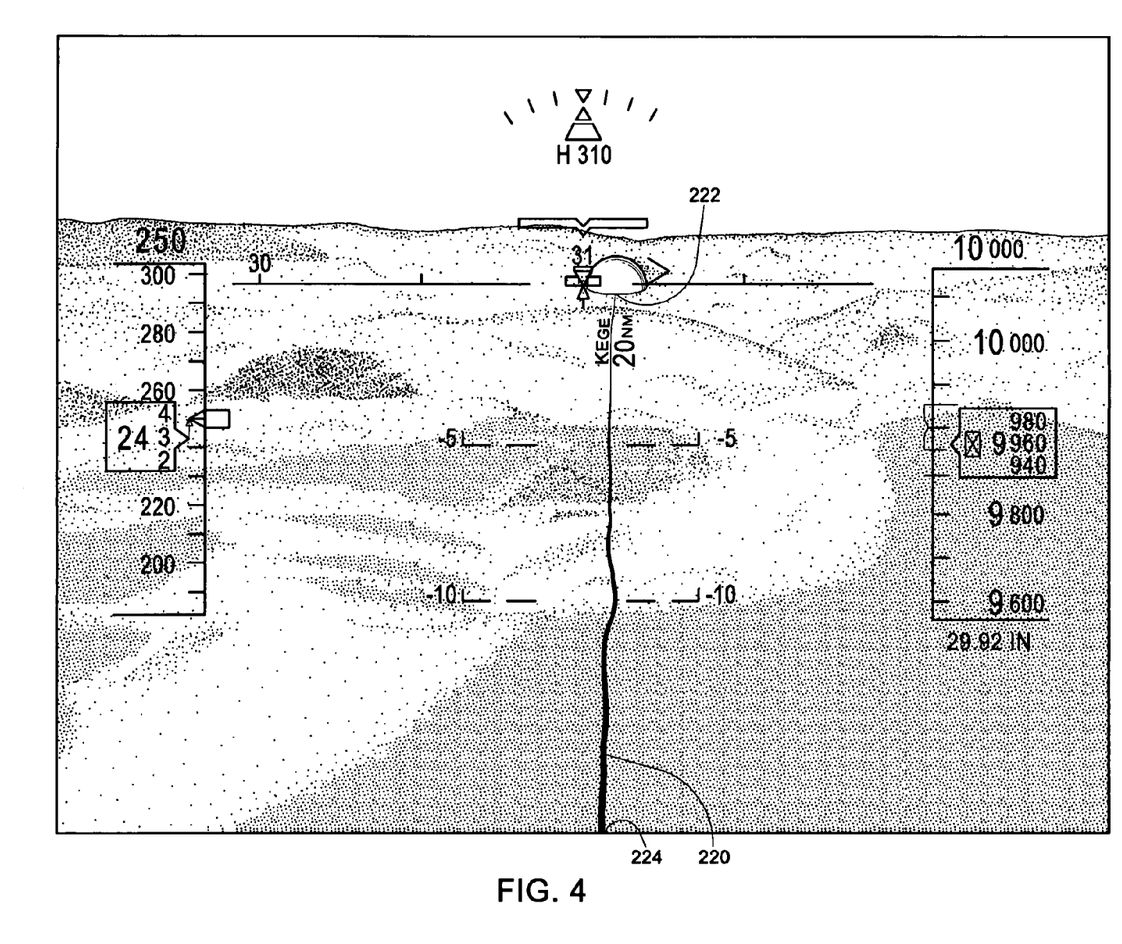
FIG. 4 depicts an exemplary illustration of an image presented on a display unit with the use of an alternative location marker.

The location marker of Eagle County Regional Airport depicted in FIG. 3A could be depicted with an alternative form. In an embodiment of FIG. 4, a location marker could include any object comprised of an extension 220 that could represent a ground track between the aircraft position and the marked location, wherein such ground track follows the contours of the underlying terrain. Here, a location marker comprises a proximal end portion 222 of the extension located at or near the edge of a location highlighter (or a location if a location highlighter is not used), a distal end portion 224 of the extension terminating at or near the terrain closest to the aircraft, and information (e.g., "KEGE 20 NM") presented adjacent to the extension. In an alternative embodiment, information could be presented as part of the extension; for instance, the extension could be employed as a distance scale made up of evenly spaced tick marks from which a pilot could estimate the distance to the location or some other point along the way. Such scale could also be depicted to resemble a scale depicted in navigational charts or maps. As embodied herein, the same characteristics disclosed above for location highlighters and location markers could be applied to the embodiments of FIG. 4.

It should be noted that location highlighters and location markers embodied herein may be applied to other objects including, but not limited to, navigation facilities and designated airspaces as well as other navigational information that may be obtained as location data from databases and other aircraft systems. The embodiments depicted in the drawings of FIGS. 2 through 4 should not be construed as a limitation of the techniques and methods disclosed and embodied herein.

Figure 5:
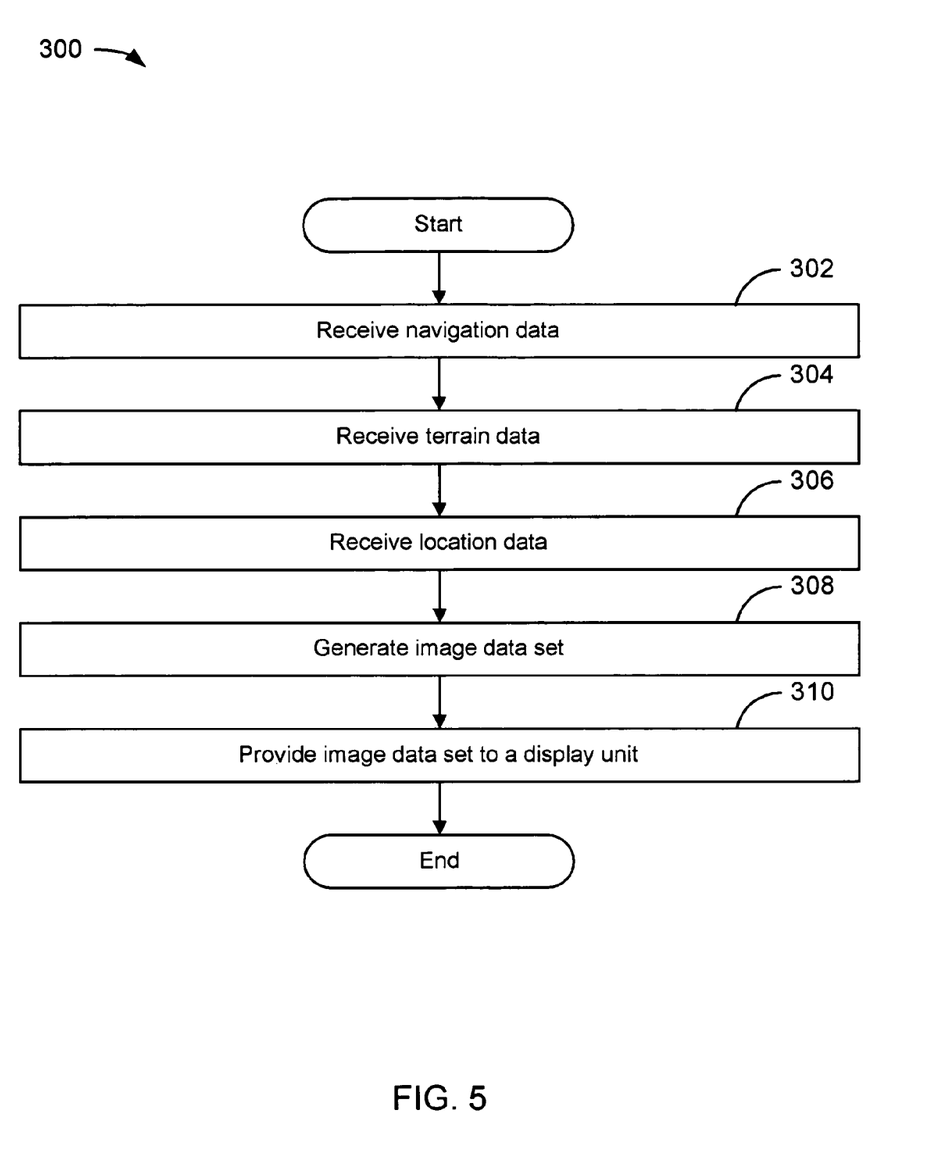
FIG. 5 provides a flowchart illustrating a method for presenting information on an aircraft display unit with the use of location markers.

FIG. 5 depicts a flowchart 300 of an example of a method for generating location information presented on an aircraft display unit using location markers. In another embodiment, FIG. 5 provides an example of a method for generating at least one location highlighter for enhancing an object on an aircraft display unit. The flowchart begins with module 302 with the receiving of navigation data by an IG processor 150, including data representative of the aircraft position and attitude in flight, i.e., orientation. The navigation data could be provided by a navigation system 110 to an IG processor 150, and position could comprise of geographic position (e.g., latitude and longitude coordinates) and altitude. As embodied herein, the receiving of data by a processor or the providing of data to a processor may include a step in which the processor performs a retrieval operation of such data. As embodied herein, a change in aircraft position could be used to determine the heading or direction of a scene outside the aircraft.

The flowchart continues with module 304 with the receiving of terrain data. Terrain data may be received from a terrain data source 120. In one embodiment, terrain data of a scene outside the aircraft could be provided by a terrain database. In another embodiment, terrain data could be provided by other aircraft systems or components thereof including, but not limited to, an SVS, an EVS, and a TAWS. The flowchart continues with module 306 with the receiving of location data. Location data of one or more objects located in a scene outside the aircraft may be received from location data source 130. Location data could be used to determine a location highlighter and/or location marker data associated with each object. In one embodiment, a location data source could comprise an airport database. In another embodiment, a location data source could comprise a navigation database. In another embodiment, a location data source could comprise an airspace database. In another embodiment, a location data source could comprise other aircraft systems including, but not limited to, a flight management system and an AAWS.

The flowchart continues to module 308 with the generation of an image data set by an IG processor 150 comprising of terrain data and location highlighter data and/or location marker data. As embodied herein, an IG processor 150 could determine terrain image data from terrain data if terrain image data has not been previously provided; such terrain data could be based be upon navigation data and be representative of the scene outside of the aircraft at the position of the aircraft. As embodied herein, an IG processor 150 could determine location highlighter data and/or location marker data associated with and/or representative of at least one object located in a scene outside the aircraft.

As discussed above, one or more location highlighters and/or location markers could be available to or configurable by a manufacturer or end-user. In one embodiment, a location marker could comprise of an extension, a proximal end portion of the extension located at or near the edge of a location highlighter (or a location if a location highlighter is not used), and a distal end portion of the extension terminating at or near the terrain closest to the aircraft. In another embodiment, the distal end portion could have an informational placard. In another embodiment, information could be presented adjacent to the extension. In another embodiment, information could be presented as part of the extension; for instance, the extension could be employed as a distance scale made up of evenly spaced tick marks from which a pilot could estimate the distance to the location.

In another embodiment, the appearance of each highlighter and/or marker could depend on the object (e.g., airport, navigation facility, type of airspace, etc.). In another embodiment, each highlighter and/or marker could appear as multi-dimensional or as one or more shapes; for example, a shape of a location marker could include, but is not limited to, lines, arrows, pointers, or any other shape of which the proximal end portion of the extension is substantially reduced to a point. In another embodiment, the appearance of each highlighter and/or marker could comprise enhancing effects. In another embodiment, each highlighter and/or marker could be color-coded, where the use of colors could be based upon criteria such as, but not limited to, distance from the aircraft and type of object. In another embodiment, each highlighter and/or marker could remain steady or flash intermittently. In another embodiment, each highlighter and/or marker may include an identifier that could display an alpha-numeric identifier such as, but not limited to, ICAO and/or IATA airport identifiers. In another embodiment, each highlighter and/or marker may include distance information to the object. In another embodiment, information in a location marker could be presented as part of the extension; for instance, the extension could be employed as a distance scale made up of evenly spaced tick marks from which a pilot could estimate the distance to a location.

The flowchart continues to module 310 with the providing of an image data set to a display unit. Such image data set may be representative of a three-dimensional perspective view of a scene outside the aircraft comprising terrain and one or more location highlighters and/or location markers associated with one or more objects as disclosed herein. In one embodiment, a display unit could comprise an HDD unit. In another embodiment, a display unit could comprise a HUD unit. In an additional embodiment, a display unit could present an image upon receipt of an image data set, whereby the location of at least one object of the image presented on the display unit is enhanced with a location highlighter and/or information associated with at least one object is presented by a location marker. Then, the flowchart proceeds to the end.

It should be noted that the method steps described above could be embodied in computer-readable media including, but not limited to, computer instruction code. It shall be appreciated to those skilled in the art that not all method steps must be performed, nor must they be performed in the order stated. As embodied herein, the actions that could be performed by an IG processor 150 are included as method steps.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements thereto as falling within the true spirit and scope of the present invention.

What is claimed is:

1. A system for generating location information presented on an aircraft display unit, such system comprising:
   a source of navigation data;
   a source of terrain data;
   a source of location data of at least one fixed object;
   an image generating processor configured to
      receive navigation data representative of aircraft position and orientation;
      receive terrain data corresponding to the navigation data;
      receive location data corresponding to the navigation data and representative of a fixed location of at least one object located in the scene outside the aircraft, where the fixed location has been predefined prior to flight;
      generate an image data set representative of each object marked with a location marker against the background of a three-dimensional perspective of a scene outside the aircraft, wherein
         the image data set is generated as a function of the terrain data and location marker data associated with the location data, further wherein
         the location marker data is determined as a function of the type of each object and is comprised of data representative of enhancing effects; and
      provide the image data set to a tactical display unit; and
   the tactical display unit configured to
      receive the image data set, and
      present an image represented in the image data set on the tactical display unit, whereby
         at least one location marker comprised of an extension, a proximal end, and a distal end appears superimposed against the three-dimensional perspective scene outside the aircraft, where
            each location marker corresponds to no more than one object, the proximal end of each location marker marks the location of its corresponding object,
            each location marker identifies its corresponding object, and
            each location marker corresponds to the type of its corresponding object and is comprised of at least one configurable enhancing effect.

2. The system of claim 1, wherein the source of terrain data, location data, or both is comprised of a terrain database.

3. The system of claim 1, wherein the source of terrain data is comprised of an aircraft system.

4. The system of claim 1, wherein the source of location data is comprised of an airport database, an airspace database, a navigation database, an aircraft system, or a combination thereof.

5. The system of claim 1, wherein the image generating processor is a processor of a synthetic vision system, an enhanced vision system, or a combined vision system.

6. The system of claim 1, wherein the image data set includes data representative a location highlighter to enhance at least one object against the background of the three-dimensional perspective of a scene outside the aircraft, wherein
   the function for generating the image data set includes location highlighter data associated with the location data, further wherein
   the location highlighter data is determined as a function of the type of the object and is comprised of data representative of enhancing effects, whereby
      at least one location highlighter appears superimposed against the three-dimensional perspective scene outside the aircraft, where
         the location of at least one object is highlighted as a three-dimensional location highlighter corresponding to the type of the object and comprised of at least one configurable enhancing effect.

7. The system of claim 1, wherein the degree of at least one configurable enhancing effect of each location marker is determined as a function of the distance between the aircraft position and the object, such that the visual appearance of the location marker changes as the aircraft approaches the object.

8. The system of claim 1, wherein the extension of at least one location marker is representative of the ground track between the aircraft and its corresponding object.

9. The system of claim 1, wherein at least one location marker is further comprised of an information placard located at or near its distal end within which the identification of its corresponding object is presented.

10. An apparatus for generating location information presented on an aircraft display unit, such apparatus comprising:
an input communications interface to facilitate a providing of data from at least one data source to an image generating processor;
the image generating processor configured to
receive navigation data representative of aircraft position and orientation;
receive terrain data corresponding to the navigation data;
receive location data corresponding to the navigation data and representative of a fixed location of at least one object located in the scene outside the aircraft, where the fixed location has been predefined prior to flight;
generate an image data set representative of each object marked with a location marker against the background of a three-dimensional perspective of a scene outside the aircraft, wherein
the image data set is generated as a function of the terrain data and location marker data associated with the location data, further wherein
the location marker data is determined as a function of the type of each object and is comprised of data representative of enhancing effects; and
provide the image data set to a tactical display unit for presenting an image represented in the image data set, whereby
at least one location marker comprised of an extension, a proximal end, and a distal end appears superimposed against the three-dimensional perspective scene outside the aircraft, where
each location marker corresponds to no more than one object,
the proximal end of each location marker marks the location of its corresponding object,
each location marker identifies its corresponding object, and each location marker corresponds to the type of its corresponding object; and
an output communications interface to facilitate the providing of the image data set to the tactical display unit.

11. The apparatus of claim 10, wherein the source of terrain data, location data, or both is comprised of at least one database or aircraft system.

12. The apparatus of claim 10, wherein the image generating processor is a processor of a synthetic vision system, an enhanced vision system, or a combined vision system.

13. The apparatus of claim 10, wherein the image data set includes data representative a location highlighter to enhance at least one object against the background of the three-dimensional perspective of a scene outside the aircraft, wherein
the function for generating the image data set includes location highlighter data associated with the location data, further wherein
the location highlighter data is determined as a function of the type of the object and is comprised of data representative of enhancing effects, whereby
at least one location highlighter appears superimposed against the three-dimensional perspective scene outside the aircraft, where
the location of at least one object is highlighted as a three-dimensional location highlighter corresponding to the type of the object and comprised of at least one configurable enhancing effect.

14. The apparatus of claim 10, wherein the degree of at least one configurable enhancing effect of each location marker is determined as a function of the distance between the aircraft position and the object, such that
the visual appearance of the location marker changes as the aircraft approaches the object.

15. The apparatus of claim 10, wherein the extension of at least one location marker is representative of the ground track between the aircraft and its corresponding object.

16. The apparatus of claim 10, wherein at least one location marker is further comprised of an information placard located at or near its distal end within which the identification of its corresponding object is presented.

17. A method for generating location information presented on an aircraft display unit, such method comprising:
performing the following elements, where such elements are performed by an image generating processor an of aircraft avionics system:
receiving navigation data representative of aircraft position and orientation from an aircraft navigation data source;
receiving terrain data corresponding to the navigation data from an aircraft terrain data source;
receive location data corresponding to the navigation data and representative of a fixed location of at least one object located in the scene outside the aircraft, where the fixed location has been predefined prior to flight;
generating an image data set representative of each object marked with a location marker against the background of a three-dimensional perspective of a scene outside the aircraft, wherein
the image data set is generated as a function of the terrain data and location marker data associated with the location data, further wherein
the location marker data is determined as a function of the type of each object and is comprised of data representative of enhancing effects; and
providing the image data set to a tactical display unit for presenting an image represented in the image data set, whereby
at least one location marker comprised of an extension, a proximal end, and a distal end appears superimposed against the three-dimensional perspective scene outside the aircraft, where
each location marker corresponds to no more than one object,
the proximal end of each location marker marks the location of its corresponding object,
each location marker identifies its corresponding object, and
each location marker corresponds to the type of its corresponding object and is comprised of at least one configurable enhancing effect.

18. The method of claim 17, wherein the image data set includes data representative a location highlighter to enhance at least one object against the background of the three-dimensional perspective of a scene outside the aircraft, wherein the function for generating the image data set includes location highlighter data associated with the location data, further wherein the location highlighter data is determined as a function of the type of the object and is comprised of data representative of enhancing effects, whereby at least one location highlighter appears superimposed against the three-dimensional perspective scene outside the aircraft, where the location of at least one object is highlighted as a three-dimensional location highlighter corresponding to the type of the object and comprised of at least one configurable enhancing effect.

19. The method of claim 17, wherein the degree of at least one configurable enhancing effect of each location marker is determined as a function of the distance between the aircraft position and the object, such that the visual appearance of the location marker changes as the aircraft approaches the object.

20. The method of claim 17, wherein the extension of at least one location marker is representative of the ground track between the aircraft and its corresponding object.

* * * * *